United States Patent [19]

Leason

[11] 4,400,277

[45] Aug. 23, 1983

[54] LOW-PROFILE INLINE FILTER

[75] Inventor: Hayden Leason, Palmas del Mar, P.R.

[73] Assignee: Filtertek, Inc., Hebron, Ill.

[21] Appl. No.: 277,323

[22] Filed: Jun. 25, 1981

[51] Int. Cl.$^3$ ............................................. B01D 27/00
[52] U.S. Cl. ................................. 210/441; 210/447; 210/450; 210/454
[58] Field of Search ............... 210/437, 441, 442, 445, 210/447, 448, 450, 451, 453, 454

[56] References Cited

U.S. PATENT DOCUMENTS

| | | | |
|---|---|---|---|
| 2,839,056 | 6/1958 | Mailly | 210/453 |
| 3,954,623 | 5/1976 | Hammer et al. | 210/448 X |
| 3,993,561 | 11/1976 | Swearingen | 210/448 X |
| 4,169,795 | 10/1979 | Raines | 210/455 X |

*Primary Examiner*—Thomas G. Wyse
*Attorney, Agent, or Firm*—Hume, Clement, Brinks, Willian & Olds, Ltd.

[57] ABSTRACT

An improved low-profile inline fluid filter (10), for IV sets and the like, comprises only two discrete units: a shell unit (11) and a screen unit (12). The screen unit (12) is adapted to fit substantially within the shell unit (11) such that the screen unit (12) and the shell unit (11) are connected to each other at both ends.

6 Claims, 7 Drawing Figures

U.S. Patent  Aug. 23, 1983  4,400,277
FIG. 1
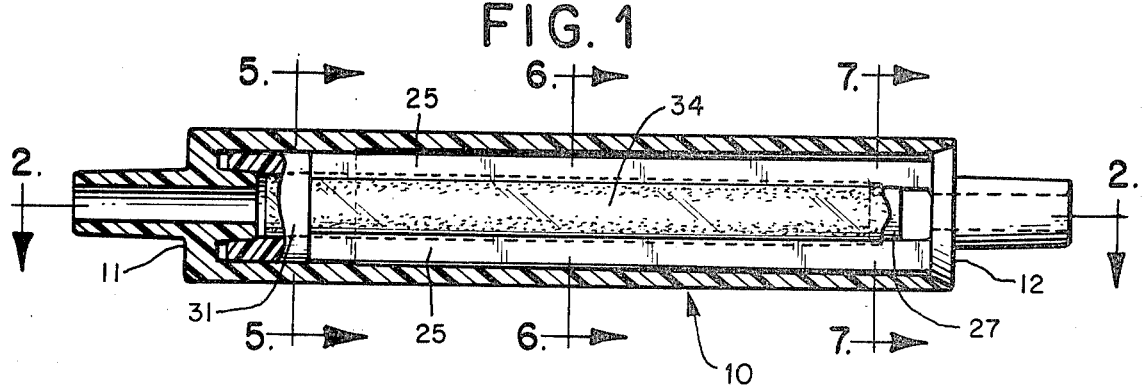
FIG. 2
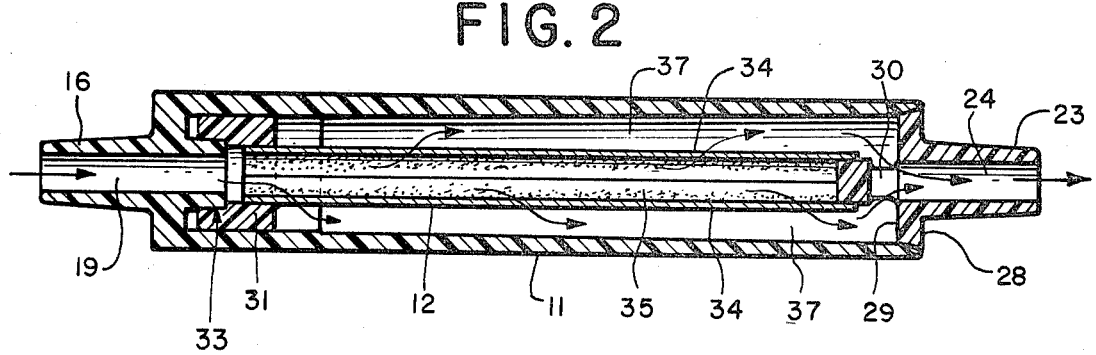
FIG. 3
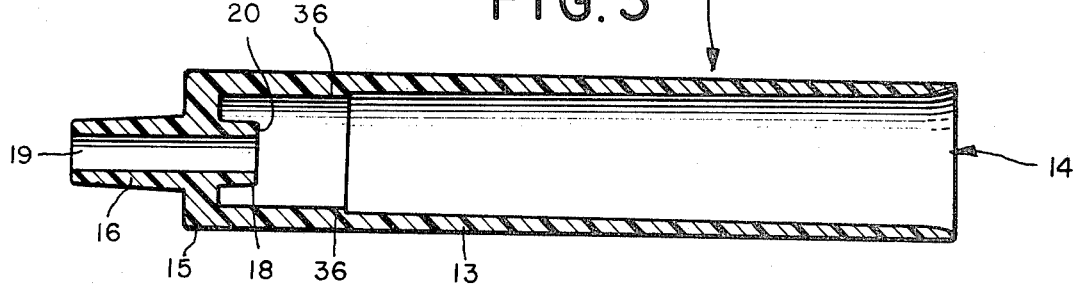
FIG. 4
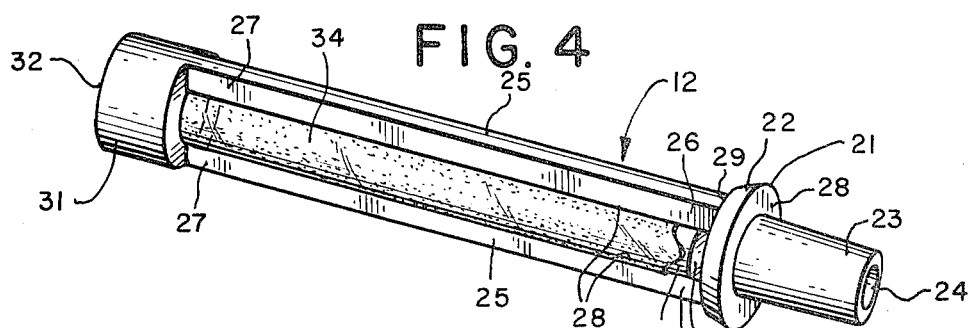
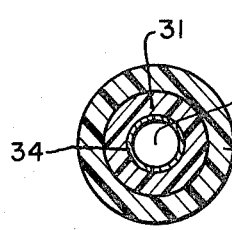
FIG. 5
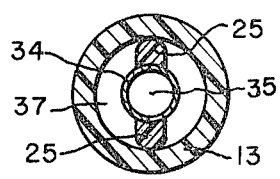
FIG. 6
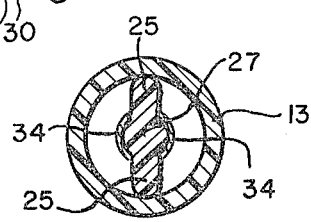
FIG. 7

LOW-PROFILE INLINE FILTER

BACKGROUND OF THE INVENTION

This invention relates to improvements in low-profile inline filters, for use in intravenous (IV) sets and the like.

Low-profile inline IV filters are known in the art. They, like other IV filters, are generally connected in series with two portions of an IV tube to filter the fluid flowing through the tube. Low-profile inline filters offer an advantage over large, bulky filters in that they can be conveniently located on an IV line at a site close to the injection at which the IV line connects to a body, without causing an obstruction to the manipulation of the IV line and the injection needle, and without presenting a bulky mass that can disturb the IV connection either by pulling on it with its own weight or by being bumped, pulled, or snagged. Often a low-profile filter positioned close to the injection also provides a convenient hand grip for manipulating the IV line and the injection needle.

However, the known low-profile inline filters are generally assembled from a multiplicity of elements or units. The proliferation of elements has numerous disadvantages. The assembly of the filters becomes more complicated and time consuming with an increase in the number of elements. A proliferation of elements increases the chance for error during assembly, and thus it creates filter reliability problems. Because great care must be taken that the filters have no leaks, external or internal, at the points of connection of the various elements, the tolerances of the mating portions of the various elements must be kept close: an increase in the number of elements increases the number of portions at which close tolerances must be kept, thus increasing the manufacturing costs. And because the connections between elements are possible sources of leaks, an increase in the number of connections decreases filter reliability. Thus it can be seen that proliferation of the number of elements of which a filter is assembled increases the difficulty and cost of manufacture of the filters and may lead to decreased reliability, or a higher reject rate, of the assembled filters.

Furthermore, the known filters are generally constructed such that the mechanical strength of the filter is provided merely by the external filter housing, with the filtering element and its supporting structure being suspended within the filter housing. The mechanical strength of the filtering element support structure is thus not utilized to add to the mechanical strength of the filter. But in the case of inline filters, which, as was mentioned above, are often used as grips for manipulating the IV set, the stresses on the filter resulting from such manipulation may be so large that the filter housing alone may not be able to withstand them. Thus damage to the filters, such as fracture, may possibly result. Alternatively, reinforcing the structure of the filters may increase their manufacturing cost.

SUMMARY OF THE INVENTION

This invention is directed to improvements in low-profile inline filters, for use in IV sets and the like, which avoid these and other disadvantages of the prior art filters.

According to this invention, a low-profile inline filter is comprised of two elements: a shell unit and a screen unit.

The shell unit is substantially tubular. It has a hollow, substantially cylindrical portion which is open at one end and terminates at the other end in an elongated portion restricted in diameter. This restricted end portion defines a fluid passageway therethrough and forms an adaptor for connecting the shell unit to a tube, such as an IV tube. The restricted end portion extends in part into the cylindrical portion to form therein a donut-shaped seat portion laterally spaced from the inner wall of the cylindrical portion.

The screen unit has a disc-shaped cap portion from which extends to one side an elongated end portion restricted in diameter. The restricted end portion and the cap portion define a fluid passageway therethrough, and the restricted end portion forms an adaptor for connecting the screen unit to a tube. A plurality of elongated ribs extend longitudinally to the other side from the cap portion. The ribs are spaced apart from each other and are positioned substantially symmetrically around the fluid passageway opening in the cap. The ribs are attached at one end to the cap portion, and at the other to a ring member. A filter membrane is mounted inbetween the ribs to form a tubular passageway extending longitudinally between the ribs. A plug member, longitudinally spaced from the cap portion, is positioned between the ribs to close one end of the tubular passageway. The plug member forces fluid entering the filter through the fluid passageway of one restricted end portion to pass through the filter membrane before exiting the filter through the fluid passageway of the other restricted end portion.

The screen unit is adapted to fit substantially within the shell unit such that the ring member of the screen unit seats over and engages the seat portion of the shell unit, and the cap portion of the screen unit seats upon the open end of the shell unit, closing it.

Because the filter is comprised of only two discrete units, as opposed to a multiplicity of units, the disadvantages caused by a proliferation of units, such as increased manufacturing cost and lowered reliability, are avoided.

The construction of the filter is such that the shell unit and the screen unit of the filter are connected to each other at both ends. Thus the screen unit is not merely suspended within the shell unit, but rather adds its mechanical strength to that of the shell unit to create therewith a relatively strong and stress-resistant filter which is relatively less susceptible to mechanical damage due to handling, and which consequently does not require special reinforcement.

These and other advantages of the present invention will become more apparent during the following description of the presently preferred embodiment of the invention, considered together with the drawings.

BRIEF DESCRIPTION OF THE DRAWINGS

FIG. 1 is a cutaway longitudinal view of the preferred embodiment of the improved low-profile inline filter;

FIG. 2 is a sectional view of the filter taken along line 2—2 of FIG. 1;

FIG. 3 is a sectional view of the shell unit of the filter of FIG. 2;

FIG. 4 is a plan view of the screen unit of the filter of FIG. 2;

FIG. 5 is a cross-sectional view of the filter taken along line 5—5 of FIG. 1;

FIG. 6 is a cross-sectional view of the filter taken along line 6—6 of FIG. 1; and FIG. 7 is a cross-sectional view of the filter taken along line 7—7 of FIG. 1.

DETAILED DESCRIPTION OF THE PREFERRED EMBODIMENT

Turning now to the drawing, FIGS. 1 and 2 show the preferred embodiment of the improved low-profile in-line filter, designated generally as 10. The total length of the filter 10 is preferably about 2.63 in. (6.7 cm.), and the total width, or outer diameter, of the filter 10 is preferably about 0.38 in. (1.0 cm.) The filter 10 is comprised of two elements, or units: a shell unit 11, shown in FIG. 3, and a screen unit 12, shown in FIG. 4. With the exception of a filter membrane, the filter 10 is preferably made of acrylic, styrene, or cryolite.

The shell unit 11 is substantially tubular, as shown in FIG. 3. The shell unit 11 has a hollow, substantially cylindrical portion 13 (also see FIGS. 5, 6 and 7). The cylindrical portion 13 is open at one end, designated as 14. At the other end, designated as 15, the inner surface of the cylindrical portion 13 forms a ledge 36 which decreases the inner diameter of the cylindrical portion 13 at the end 15. The cylindrical portion 13 terminates at the end 15 in an elongated portion whose diameter is restricted, i.e., smaller, in comparison with the diameter of the cylindrical portion 13. This restricted end portion 16 forms a tube adaptor, for connecting the shell unit 11 to a tube, for example an IV tube (not shown). The connection is made by sliding the end of the tube over the restricted end portion 16. Preferably, the restricted end portion 16 is tapered, and has a standard luer taper. The taper of the restricted end portion 16 adapts the restricted end portion 16 for connecting with an IV tube (not shown) easily yet tightly and in a hermetically sealing manner. The restricted end portion 16 extends in part into the cylindrical portion 13 to form therein a donut-shaped seat portion 18. The seat portion 18 is laterally spaced from the inner wall of the cylindrical portion 13. Preferably, the outer diameter of seat portion 18 is slightly tapered along its length toward its end 20. The restricted end portion 16 defines a fluid passageway 19 therethrough, for allowing the interior of the shell unit 11 to communicate with the tube connected in use to the restricted end portion 16.

The screen unit 12 is designed to be mounted in the shell unit 11. As shown in FIG. 4, the screen unit 12 has a disc-shaped cap portion 21. The circumferential surface 22 of the cap portion 21 is preferably tapered. The cap portion 21 is adapted to fit over and close the open end 14 of the shell unit 11. An elongated restricted end portion 23 extends to one side of the cap portion 21 from a face 28 of the cap portion 21. The size, shape, and function of the end portion 23 are analogous to those of the end portion 16 of the shell unit 11. The end portion 23 and the cap portion 21 define a fluid passageway 24 therethrough, for allowing the interior of the screen unit 12 to communicate with the tube connected in use to the end portion 23. Two elongated ribs 25 extend to the other side of the cap portion 21 from a face 29 of the cap portion 21. The ribs 25 are spaced apart from each other, they are symmetrically arranged around the opening in the cap portion 21 to the fluid passageway 24, and they extend longitudinally away from the cap portion 21 in parallel with each other (also see FIG. 6). Each rib 25 is attached at one end 26 to the cap portion 21 and at the other end 27 to a ring member 31 (also see FIG. 5). The ring member 31 is preferably a hollow cylinder. Preferably the inner surface of ring member 31 defines a ledge 33 (see FIG. 2) along a part thereof. The ledge 33 extends inwardly from end 32 of the ring member 31 and increases the inner diameter of the ring member 31 such that, upon assembly of the filter 10, the ledge 33 will snugly seat upon and engage the seat portion 18 of the shell unit 11.

Extending between the ribs 25 and mounted to the facing sides 28 of the ribs 25 and to the interior surface of the ring portion 31 is a filter membrane 34 (see FIGS. 5, 6, and 7). The filter membrane 34 thus defines a tubular substantially cylindrical passageway 35 which extends longitudinally between the ribs 25. The filter membrane 34 is made of a thin sheet of screen material, which is permeable to fluids but not to particulate matter over a certain size. The filter membrane 34 is preferably made of reinforced cellulose acetate. Alternatively, it can be made of teflon, cellulose nitrate, woven monofilament polyester or nylon, or other suitable material. The minimum size of the particulate matter to which the filtering portion 34 is impermeable is determined by the mesh size of the screen from which the filtering portion 34 is made. The filter 10 is versatile in that the membrane can be of any mesh size, depending on the use for which the filter is intended though preferably it is on the order of a few microns, for example approximately 5 microns. The filtering portion 34 is preferably sized to have an effective screen area of about 3.0 square centimeters ($cm^2$). The mounting of the filter membrane 34 is preferably accomplished by insert-molding the other portions of the screen unit 12 onto the membrane 34.

A plug member 27, preferably cylindrical in shape, is positioned between the ribs 25 to close off one end of the tubular passageway 35. The plug member 27 is attached to the facing surfaces 28 of the ribs 25 and to the filter membrane 34 (see FIG. 7). The plug member 27 is positioned longitudinally spaced from the cap portion 21 so as to not close off the passageway 24. Rather, the plug member 27 and the face 29 of the cap portion 21 define between them a fluid inlet 30 which allows the passageway 24 to communicate with the area 37 (see FIGS. 2 and 6) which externally surrounds the ribs 25.

To assemble the filter 10, the screen unit 12 is inserted into the shell unit 11 such that the ring member 31 of the screen unit 12 seats over and engages the seat portion 18 of the shell unit 11 and the cap portion 21 of the screen unit 12 seats upon the open end 14 of the shell unit 11. The ledge 36 of the cylindrical portion 13 helps to guide the ring portion 31 onto the seat portion 18. The connections between the shell unit 11 and the screen unit 12 are then hermetically sealed, preferably by being sonically welded.

Because the filter 10 is comprised of only two discrete units, the manufacture and assembly of the filter 10 is simplified and its costs are reduced. And because the shell unit 11 and the screen unit 12 are connected to each other at both of their ends, the screen unit 12 adds its mechanical strength to that of the shell unit 11 to produce a filter 10 which is stronger and therefore less susceptible to damage.

To use the filter 10, the filter 10 is connected in series between two sections of tubing, by inserting the restricted end portions 16 and 23 into the ends of the tubes. Preferably, the filter 10 is positioned between the two sections of tubing with such an orientation that the fluid will flow into the filter 10 through the passageway 19 and out of the filter 10 through the passageway 24, as shown by the arrows in FIG. 2. Assuming a direction of fluid flow as shown in FIG. 2, unfiltered fluid enters the filter 10 through the passageway 19 of the shell unit 11 and flows into the tubular passageway 35 of the screen unit 12. As the passageway 35 is blocked at the far end by the plug member 27, the fluid seeps through the filter membrane 34 into the cavity 37 between the screen unit 12 and the cylindrical portion 13 of the shell unit 11. Particulate impurities in the fluid, however, cannot pass through the filter membrane 34, and they become trapped in the tubular passageway 35. Thus the fluid is filtered. Filtered fluid flows along ribs 25 to the inlet 30, and through the inlet 30 and passageway 24 out of the filter 10.

Of course, it should be understood that various changes and modifications to the preferred embodiment described above will be apparent to those skilled in the art. For example, the dimensions of the filter may be varied. The filter membrane mesh size may be changed according to application. The sealing to each other of the units comprising the filter may be accomplished by any suitable means. Or the number and configuration of the ribs may be changed. These and other changes can be made without departing from the spirit and scope of the invention and without diminishing its attendant advantages. It is therefore intended that such changes and modifications be covered by the following claims.

I claim:

1. An improved low-profile inline filter, for IV sets and the like, consisting of:

a tubular shell unit having a hollow, substantially cylindrical portion open at one end and terminating at the other end in an elongated portion restricted in diameter defining a fluid passageway therethrough and forming an adaptor for connecting the shell unit to a tube, the restricted end portion extending in part into the cylindrical portion to form therein a donut-shaped seat portion laterally spaced from the inner wall of the cylindrical portion; and an elongated screen unit having a disc-shaped cap portion at one end, a ring member at the other end, and a plurality of integral ribs extending therebetween, the cap portion having an elongated portion restricted in diameter extending from the cap portion and forming an adaptor for connecting the screen unit to a tube, the cap portion and the restricted end portion defining a fluid passageway therethrough, the ribs being spaced apart from each other and positioned substantially symmetrically around the fluid passageway opening in the cap portion, a filter membrane mounted in between the ribs to define a tubular passageway extending longitudinally between the ribs, and an integral plug member positioned between the end of the ribs adjacent the cap portion to close the end of the tubular passageway near the cap portion, the plug member being longitudinally spaced from the cap portion to define a fluid passageway between the plug member and the cap portion;

the screen unit being adapted to fit substantially within the shell unit such that the ring member of the screen unit seats over and engages the seat portion of the shell unit and the cap portion of the screen unit seats upon the open end of the shell unit to close it.

2. The apparatus of claim 1 wherein the outer surface of each of the restricted end portions defines a standard luer taper.

3. The apparatus of claim 1 wherein the number of elongated ribs is two.

4. The apparatus of claim 1 wherein the filter membrane has a mesh size on the order of a few microns.

5. The apparatus of claim 1 wherein the tubular passageway extending longitudinally between the ribs is substantially cylindrical.

6. The apparatus of claim 1 wherein the ring member engages the seat portion, and wherein the cap portion closes the shell unit open end, by being sonically welded together to form a hermetic seal.

* * * * *